US008657046B2

(12) United States Patent
Caudill

(10) Patent No.: US 8,657,046 B2
(45) Date of Patent: Feb. 25, 2014

(54) ENGINE SYSTEM

(75) Inventor: LeRoy Caudill, Rochester Hills, MI (US)

(73) Assignee: Caudill Energy Systems, Corporation, Birmingham, MI (US)

( * ) Notice: Subject to any disclaimer, the term of this patent is extended or adjusted under 35 U.S.C. 154(b) by 954 days.

(21) Appl. No.: 12/327,325

(22) Filed: Dec. 3, 2008

(65) Prior Publication Data

US 2010/0000806 A1 Jan. 7, 2010

Related U.S. Application Data

(60) Provisional application No. 60/991,907, filed on Dec. 3, 2007.

(51) Int. Cl.
*B60K 1/00* (2006.01)
(52) U.S. Cl.
USPC .............. 180/65.31; 180/302; 180/65.28
(58) Field of Classification Search
USPC ........ 180/65.21, 65.22, 65.28, 65.285, 65.31, 180/302
See application file for complete search history.

(56) References Cited

U.S. PATENT DOCUMENTS

| 865,496 | A | | 9/1907 | Herrington |
|---|---|---|---|---|
| 1,963,091 | A | | 6/1934 | Jenkins |
| 3,379,008 | A | | 4/1968 | Manganaro |
| 3,502,001 | A | * | 3/1970 | Moore .............................. 91/49 |
| 3,503,464 | A | * | 3/1970 | Yardney ................... 180/65.245 |
| 3,704,760 | A | | 12/1972 | Maruyama |
| 3,867,812 | A | | 2/1975 | Van Arsdel |
| 3,925,984 | A | | 12/1975 | Holleyman |
| 3,980,152 | A | | 9/1976 | Manor |
| 4,123,910 | A | * | 11/1978 | Ellison, Sr. ..................... 60/698 |
| 4,163,367 | A | | 8/1979 | Yeh |
| 4,185,465 | A | | 1/1980 | Shaw |
| 4,433,549 | A | | 2/1984 | Zappia |
| 4,478,304 | A | | 10/1984 | Delano |
| 4,578,955 | A | | 4/1986 | Medina |
| 4,629,947 | A | | 12/1986 | Hammerslag et al. |

(Continued)

FOREIGN PATENT DOCUMENTS

| FR | 2 753 487 | 3/1998 |
|---|---|---|
| WO | 02/092373 | 11/2002 |

OTHER PUBLICATIONS

International Preliminary Report on Patentability for PCT Application No. PCT/US2008/085378, Jun. 17, 2010.

(Continued)

*Primary Examiner* — Jeffrey J Restifo
*Assistant Examiner* — Erez Gurari
(74) *Attorney, Agent, or Firm* — Carlson, Gaskey & Olds PC

(57) ABSTRACT

An engine system includes three different types of motors with complementary characteristics, which together provide increased performance and efficiency. The engine system generally includes a fuel-consuming engine (such as an internal combustion engine), an electric motor and an air motor. The air motor is powered by compressed air stored in air tanks. The air tanks can store energy much more quickly and efficiently than electric batteries. Therefore, the air tanks are a more efficient way of recouping the energy of braking the vehicle. The air tanks can be used to power the vehicle, especially at cruising speed, and can recharge the batteries over time. The three motors are complementary to one another in several ways which provide improved performance and efficiency.

16 Claims, 1 Drawing Sheet

(56) References Cited

U.S. PATENT DOCUMENTS

| | | |
|---|---|---|
| 4,798,053 A | 1/1989 | Chang |
| 4,798,257 A | 1/1989 | Kawamura et al. |
| 5,192,199 A | 3/1993 | Olofsson |
| 5,247,795 A | 9/1993 | McCullough |
| 5,460,239 A | 10/1995 | Jensen |
| 5,901,809 A | 5/1999 | Berkun |
| 6,044,924 A | 4/2000 | Adli |
| 6,070,404 A | 6/2000 | Bosley et al. |
| 6,223,846 B1 | 5/2001 | Schechter |
| 6,460,350 B2 | 10/2002 | Johnson et al. |
| 6,508,324 B1 | 1/2003 | Conley, Jr. |
| 6,644,589 B2 | 11/2003 | Woo et al. |
| 6,834,737 B2 | 12/2004 | Bloxham |
| 7,841,432 B2 * | 11/2010 | Lynn et al. .......... 180/65.21 |
| 2001/0002379 A1 | 5/2001 | Schechter |
| 2005/0126837 A1 | 6/2005 | Taxon |
| 2006/0170188 A1 | 8/2006 | Negre et al. |
| 2006/0225941 A1 | 10/2006 | Cole |
| 2007/0215396 A1 | 9/2007 | Rask et al. |

OTHER PUBLICATIONS

International Search Report for PCT Application No. PCT/US08/85378, Mar. 11, 2009.

* cited by examiner

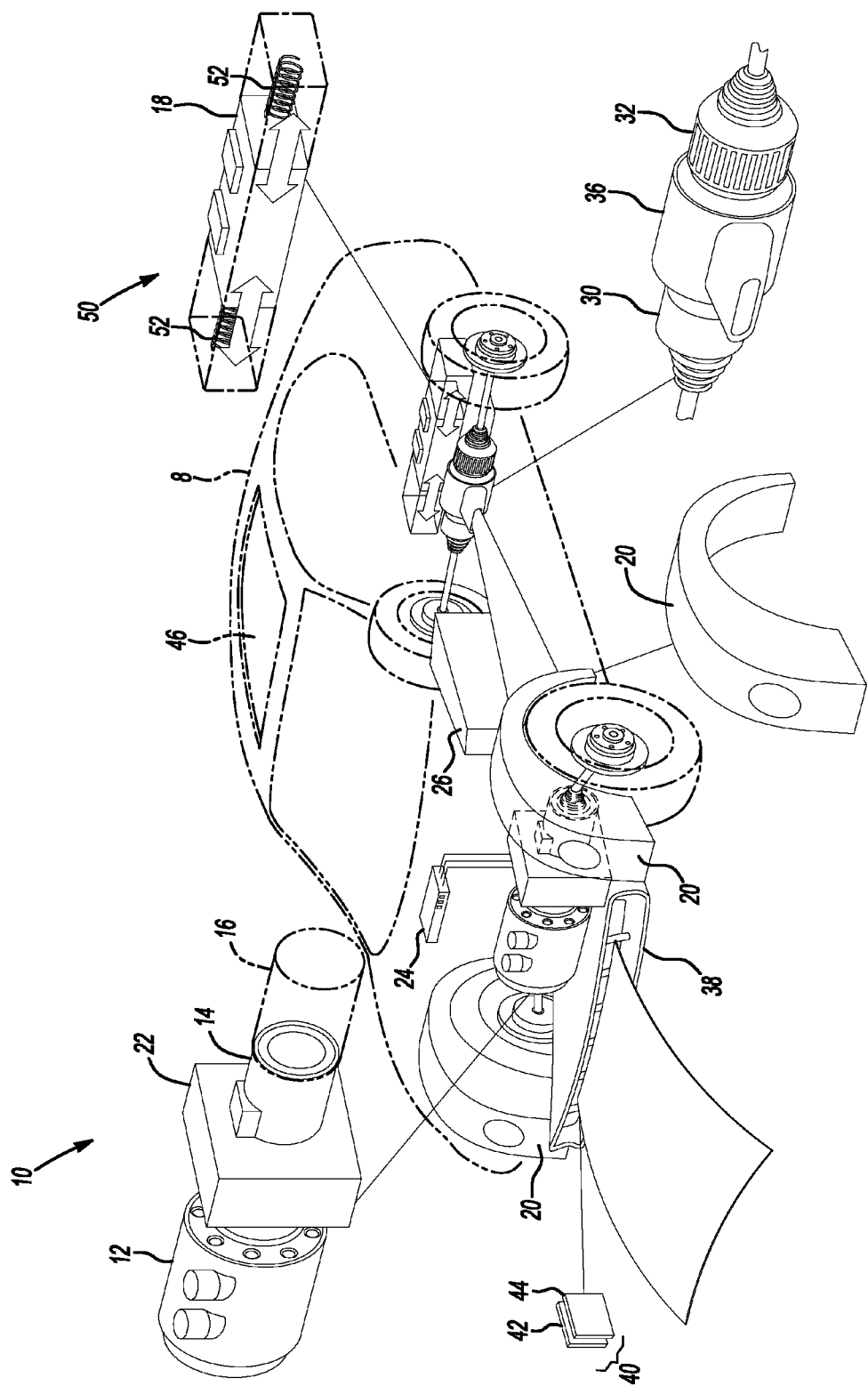

US 8,657,046 B2

ENGINE SYSTEM

This application claims priority to U.S. Provisional Application Ser. No. 60/991,907, filed Dec. 3, 2007.

BACKGROUND

The present invention relates to an engine system, particularly for vehicles. Current "hybrid" vehicles include an internal combustion engine that is supplemented by one or more electric motors powered by electrical batteries. The batteries are recharged by recouping some of the energy that would otherwise be lost during braking, i.e. regenerative braking. One problem with current hybrids is that the batteries cannot be charged quickly and therefore cannot recoup all the large amounts of energy that is available in a short time during braking.

SUMMARY

The present invention provides an improved engine system with three different types of motors with complementary characteristics, which together provide increased performance and efficiency. The engine system generally includes a fuel-consuming engine (such as an internal combustion engine), an electric motor and an air motor. The air motor is powered by compressed air stored in air tanks. The air tanks can store energy much more quickly and efficiently than electric batteries. Therefore, the air tanks are a more efficient way of recouping the energy of braking the vehicle. The air tanks can be used to power the vehicle, especially at cruising speed, and can recharge the batteries over time. The three motors are complementary to one another in several more ways, which are described in more detail below.

BRIEF DESCRIPTION OF THE DRAWING

The FIGURE is a schematic view of an engine system in a vehicle according to one embodiment of the present invention.

DETAILED DESCRIPTION OF A PREFERRED EMBODIMENT

The present invention provides an engine system 10 with improved performance and efficiency. The engine system 10 generally includes an internal combustion engine (ICE) 12, an electric motor 14 and an air motor 36. The engine system 10 is installed on a vehicle 8.

The ICE 12 in this specific example is a Wankel engine, but could be another rotary engine, or even a non-rotary internal combustion engine. In this specific example, the ICE 12 is a 250 HP Wankel engine as currently utilized in the Ford Mazda RX-8. The ICE 12 includes a fuel tank 26, which in this example is a twenty gallon fuel tank 26.

The engine system 10 further includes an electric motor 14. The electric motor 14 design is a 67 HP Toyota Prius Hybrid motor. However, this electric engine may be of the type currently used in any "hybrid" electric-gasoline parallel vehicles currently being manufactured by many car companies worldwide, such as those which provide regenerative braking. In this specific example, the electric motor 14 is similar to that currently utilized in the Toyota Prius and General Motors Saturn hybrids (as two examples), which is an approximately 67 HP electric motor 14. In conjunction with the electric motor 14, the engine system 10 further includes a 96-volt battery 18, also of the type currently used in the Toyota Prius. Although more batteries 18 may be utilized in a particular application (many more such batteries 18 are used in a typical hybrid), in the specific example described here, only a single 96 volt battery 18 is necessary, which reduces the weight relative to a typical hybrid.

The air motor 36 may be of the type described generally in U.S. Pat. No. 6,868,822. Other types of air motors may be utilized, such as those from MDI in France or MYT in Italy, but the air motor 36 used in the current example is a 55 HP air engine motor as described in that patent and as provided by Di Pietro of Australia. In conjunction with the air motor 36, the engine system 10 further includes at least one air tank 20. The air tank 20 of the specifically described example is a glass-reinforced 4,200 PSI, 700 liter air tank 20 from evolution of Italy. The air tank 20 may optionally be shaped and configured to be stored under the front fenders. The engine system 10 further includes an air compressor 16 coupled to the ICE 12 and electric motor 14.

The engine system 10 further includes a planar transmission 22 that connects the ICE 12 and electric motor 14 to drive the front wheels of the vehicle 8 and the compressor 16. The planar transmission 22 may be a planetary gearset or other epicyclic gearset (or other gearset) or even a torque converter placed between two engines to drive the front wheels that permits rotary input from the two sources. In the example shown, the planar transmission 22 drives the front wheels (and the compressor 16), but any or all of the wheels could be driven. A computer 24 controls all of the components in the engine system 10 generally as will be described below.

The engine system 10 further includes a second air compressor 30 and an electric alternator or generator 32 coupled to the rear axle. The air compressor 30 is connected to repressurize the air tanks 20 based upon vehicle motion and/or regenerative braking. The generator 32 is connected to recharge the battery 18 based upon vehicle motion and/or regenerative braking. The air compressor 30 and generator 32 may be driven by the rear wheels, as shown in the example, or by any or all of the wheels. Alternatively, the generator 32 could be combined with the electric motor 14 for regenerative braking at one or all of the wheels, or a separate generator/motor could be provided at each of the wheels. Similarly, the air compressor 30 could be driven by any or all of the wheels, or separate air compressors could be driven by each of the wheels. Both the air compressor 30 and the generator 32, however configured, could be used for regenerative braking. The air compressor 30 also repressurizes the air tanks 20 upon command by the computer 24 and the generator 32 recharges the battery 18 upon command by the computer 24.

The rear wheels are driven by the air motor 36. The air motor 36 may also be driven by pressurized air from a venturi air intake system 38, with an attached turbine blade welded on the end of the air motor 36 being driven by the high speed air while the vehicle 8 is in motion. The air intake system 38 includes a plurality of electron collectors 40 in the airflow path. Each electron collector includes a pair of spaced-apart plates: a copper plate 42 and an iron Constantine plate 44. While the vehicle 8 is in motion, the air flow between the two plates 42, 44 generates an electric potential, which can be used to help charge the battery 18. As another option, a solar panel 46 on the roof of the vehicle 8 can further help charge the battery 18.

The ICE 12, electric motor 14 and air motor 36 have very different characteristics that can be used together to improve efficiency. First, the fuel in the fuel tank 26 contains more energy than could be stored by compressed air or batteries on the vehicle 8. The battery 18 and air tanks 20 can also be recharged externally, but the ICE 12 provides all or almost all of the energy to the vehicle 8 (other than the solar panel 46). The electric motor 14 and air motor 36 operate to use the energy from the ICE 12 and fuel tank 26 more efficiently. The ICE 12 is most efficient (in terms of energy output per gasoline consumed) at high torque, high output, high load conditions. The ICE 12 is least efficient when idling or when little power is needed, such as on a level freeway. The electric motor 14 and air motor 36 are used so that the ICE 12 operates only at maximum efficiency conditions.

The electric motor 14 has the ability to use energy recaptured from regenerative braking, which the ICE 12 cannot do. The electric motor 14 also has high torque output at low speeds. However, the battery 18 cannot be recharged quickly by the ICE 12. The battery 18 must be charged relatively slowly. Thus, if the ICE 12 were used to charge the battery 18, it could not do so efficiently, because the ICE 12 would have to operate at a low-load condition over a long period of time to charge the battery 18 slowly.

The air motor 36 with reasonably-sized, reasonably-compressed air tanks 20 can power the vehicle 8 over a relatively short range if the air motor 36 also had to accelerate the vehicle 8. However, the air motor 36 can power the vehicle 8 over a significant range on a level grade at highway speeds. The air tanks 20 can be repressurized quickly by the ICE 12 (or by vehicle 8 motion). For example, the air tanks 20 could be completely repressurized by the ICE 12 in approximately five to ten minutes.

In operation, the computer 24 controls the components to operate as follows (assuming that the engine system 10 is starting with a charged battery 18 and pressurized air tanks 20, although this is not necessary). First, with the vehicle 8 at rest and the ICE 12 off, the vehicle 8 can accelerate from zero to forty mph using the electric motor 14 and air motor 36, with approximately 122 HP combined and with good low speed torque (because of the electric motor 14). At forty mph, if additional acceleration is required, the ICE 12 will turn on and accelerate the vehicle 8 from forty mph to sixty mph. At sixty mph (or higher) on a level grade, the ICE 12 switches off and either the electric motor 14 or the air motor 36 can maintain the vehicle speed alone. Also, the ICE 12 typically does not operate at speeds less than forty mph, unless the driver demands a hard acceleration.

As a result, while driving normally from zero to forty mph or while cruising on a level freeway over sixty mph, the ICE 12 does not operate. Preferably, the electric motor 14 operates until the battery 18 is significantly depleted (reserving enough energy to power vehicle electrical systems) and then the air motor 36 operates until significantly depleted (or vice versa).

When both the battery 18 and air tanks 20 are depleted, the ICE 12 switches on to both power the vehicle 8 and to pressurize the air tanks 20. The pressurization takes only five to ten minutes, during which time the ICE 12 is operating very efficiently at high load, because it has a high load in pressurizing the air tanks 20 and powering the vehicle 8. After the tanks 20 are pressurized, the ICE 12 switches back off (the battery 18 could also be slightly recharged during this time). The air motor 36 then powers the vehicle 8 on the freeway while also charging the battery 18 slowly. If the air tanks 20 are depleted again before the battery 18 is recharged, the ICE 12 switches back on to repressurize them. Once the battery 18 is recharged, the air motor 36 can switch off and the electric motor 14 can power the vehicle 8. If appropriate, the air tanks 20 could be repressurized by the electric motor 14 or by vehicle motion through compressor 30. Once the battery 18 is significantly depleted (but ensuring that electrical systems in the car will still operate for some time), the air motor 36 switches back on to power the vehicle 8 until depleted.

If at any time more power is required, such as a hard acceleration, or steep grade, the computer 24 first switches on both the electric motor 14 and air motor 36 (if only one was operating previously), and then if more power is required, switches on the ICE 12. The switching and decision-making by the computer 24 happen quickly and are relatively imperceptible by the driver. With the air motor 36 and electric motor 14, the computer 24 can request a specific power requirement, from 1 HP to 122 HP, and with the ICE 12 switched on, the computer 24 can request a specific power requirement from 251 HP to 372 HP. Preferably, the driver can choose an operating mode for the engine system 10 that will affect how soon the ICE 12 will turn on when more power is required. Thus, the driver can choose to have more power available more quickly, for aggressive driving, or only as a last resort for more efficiency.

Also, during operation, regenerative braking is used to recharge the battery 18, and may be used to pressurize the tanks 20. If the optional air intake system 38 is included, it can also partially charge the battery 18 and pressurize the tanks 20. The optional solar panel 46 charges the battery 18 any time there is light and has the added known benefit of providing energy when the vehicle 8 is at rest, such as when parked outside for an extended period of time.

The air motor 36 and electric motor 14 can be considered to form a first cell ("cell one"), while the ICE 12 forms a second cell ("cell two"). Considered this way, cell one can accelerate the vehicle normally from zero to forty mph, maintain vehicle speed on level grade, partially recharge each other and has a range of several hundred miles before recharging. Cell two is called upon to accelerate the vehicle 8 from forty to sixty mph, accelerate quickly, climb hills over thirty degrees, totally recharge cell one and increase the range of the vehicle significantly.

Other optional benefits can also be achieved. As is known, the air motor 36 generates cold air in its natural operation according to its manufacturer's engine specifications. This cold air can be used to cool the vehicle 8 interior without any additional consumption of energy and the air conditioning system weighing hundreds of pounds and costing several hundreds of dollars and filled with undesirable carbon based fluids. The air motor 36 is a powerful 55 HP air conditioner generator instead of (or in addition to) the standard air conditioner compressor used in a conventional vehicle thus can put out a lot colder air in a much larger supply on hot days cooling vehicle 8 down a lot faster. The cold air can also be used several ways in an intercooler for the ICE 12, which as is known, increases the efficiency and power of the ICE 12, the cold air can be used to instantly chill the exhaust gas of the ICE 12 for better and cleaner exhaust control and quieter ride, with no muffler and no catalytic converter saving a lot of weight and cost and no heat protection pad under the carpet saving weight and costs again. All we need to replace these items is just a light weight filter canister that can suck the exhaust out causing a lower pressure feeding back on the ICE 12 engine and a more complete gasoline burn can be attained to increase mileage.

Another optional feature is shown in the FIGURE. The battery 18 can be used in a yaw control system 50. The weight of the battery 18 also serve as the weight between opposing springs 52 (springs 52 are shown schematically) in the yaw control system 50.

Although a particular configuration has been shown in the FIGURE, there are many ways of interconnecting the components of the engine system 10. The invention is not limited to the configuration shown in the drawing. In fact, the engine system 10 is not limited to a car or even to a vehicle, but could be used in an electrical generating system.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle comprising:
    a fuel-consuming first motor;
    an air motor;
    at least one air tank for storing compressed air for powering the air motor;
    an electric motor;
    at least one battery for storing electricity for powering the electric motor; and
    wherein the vehicle is driven by the first motor, the air motor and the electric motor, wherein the air used and cooled in the air motor is used to provide cooling to the vehicle, after the air is cooled in the air motor.

2. The vehicle of claim 1 wherein the at least one battery can be recharged by motion of the vehicle.

3. The vehicle of claim 2 wherein the at least one air tank can be refilled based upon motion of the vehicle.

4. The vehicle of claim 3 further including a transmission coupling the first motor, the air motor and the electric motor.

5. The vehicle of claim 1 wherein the air motor is a rotary air motor and the first motor is a rotary internal combustion engine.

6. The vehicle of claim 1 further including a compressor for storing compressed air in the air tank, wherein the compressor is powered by vehicle motion.

7. The vehicle of claim 1 further including a compressor for storing compressed air in the air tank, wherein the compressor is powered by the first motor.

8. The vehicle of claim 1 wherein the at least one battery can be recharged by the air motor.

9. The vehicle of claim 1 further including a controller for controlling the operation of the first motor, the air motor and the electric motor.

10. The vehicle of claim 9 wherein the controller selects the electric motor to drive the vehicle at low speed acceleration and the controller selects the air motor to drive the vehicle during cruising at constant speeds.

11. The vehicle of claim 10 wherein the controller selects the first motor to drive the vehicle based upon an amount of compressed air in the at least one tank.

12. The vehicle of claim 1 wherein the air used in the air motor is used to provide cooling to a passenger compartment of the vehicle.

13. The vehicle of claim 12 wherein the air motor drives first and second wheels on the vehicle but not third and fourth wheels on the vehicle, and wherein the electric motor drives the third and fourth wheels on the vehicle but not the first and second wheels on the vehicle.

14. A method of operating a vehicle including the steps of:
    a) operating an internal combustion engine to charge a battery and to compress air into at least one air tank;
    b) driving the vehicle by using electricity stored in the battery in said step a);
    c) driving the vehicle by using the compressed air stored in the at least one air tank in said step a); and
    d) using the air which is cooled by said step c) to provide cooling to a passenger compartment of the vehicle.

15. The method of claim 14 wherein the internal combustion engine, the battery and the air tank are mounted on the vehicle.

16. The vehicle of claim 10 wherein the controller selects the electric motor and not the air motor to drive the vehicle at low speed acceleration and the controller selects the air motor and not the electric motor to drive the vehicle during cruising at constant speeds.

\* \* \* \* \*